US011215704B2

(12) United States Patent
McLaughlin et al.

(10) Patent No.: US 11,215,704 B2
(45) Date of Patent: Jan. 4, 2022

(54) METHOD AND APPARATUS FOR DETERMINING LOCATION USING PHASE DIFFERENCE OF ARRIVAL

(71) Applicant: DecaWave, Ltd., Dublin (IE)

(72) Inventors: Michael McLaughlin, Dublin (IE); Gavin Marrow, Dublin (IE); Igor Dotlic, Dublin (IE)

(73) Assignee: DecaWave, Ltd., Dublin (IE)

( * ) Notice: Subject to any disclaimer, the term of this patent is extended or adjusted under 35 U.S.C. 154(b) by 224 days.

(21) Appl. No.: 16/352,480

(22) Filed: Mar. 13, 2019

(65) Prior Publication Data

US 2019/0331783 A1 Oct. 31, 2019

Related U.S. Application Data

(62) Division of application No. 15/974,412, filed on May 8, 2018, now Pat. No. 10,509,116.

(60) Provisional application No. 62/663,122, filed on Apr. 26, 2018.

(51) Int. Cl.
*G01S 13/02* (2006.01)
*G01S 3/48* (2006.01)
*G01S 3/02* (2006.01)

(52) U.S. Cl.
CPC .......... *G01S 13/0209* (2013.01); *G01S 3/023* (2013.01); *G01S 3/48* (2013.01)

(58) Field of Classification Search
CPC ...................................................... G01S 3/023
USPC ........................................................ 342/21
See application file for complete search history.

(56) References Cited

U.S. PATENT DOCUMENTS

| 4,422,076 A | 12/1983 | Tricoles et al. |
| 4,626,860 A | 12/1986 | Tricoles et al. |
| 4,734,702 A | 3/1988 | Kaplan |
| 6,233,459 B1 | 5/2001 | Sullivan |
| 6,317,611 B1 | 11/2001 | Kobayakawa |
| 7,349,461 B2 | 3/2008 | Glazko et al. |
| 7,636,397 B2 | 12/2009 | McLaughlin |
| 7,787,544 B2 | 8/2010 | McLaughlin |
| 8,358,709 B2 | 1/2013 | McLaughlin |
| 8,677,224 B2 | 3/2014 | McLaughlin et al. |
| 8,693,286 B1 | 4/2014 | Rogers et al. |
| 9,778,340 B2 | 10/2017 | Mutz et al. |

(Continued)

FOREIGN PATENT DOCUMENTS

| CN | 104484852 A | 11/2014 |
| WO | 2015051821 | 4/2015 |
| WO | 2015176776 A1 | 11/2015 |

OTHER PUBLICATIONS

Non-Final Office Action for U.S. Appl. No. 16/352,105, dated Jul. 26, 2021, 10 pages.

(Continued)

*Primary Examiner* — Erin F Heard
*Assistant Examiner* — Helena H Seraydaryan
(74) *Attorney, Agent, or Firm* — Withrow & Terranova, P.L.L.C.

(57) ABSTRACT

An ultra-wideband ("UWB") communication system comprising a transmitter and a receiver having two antennas. An UWB signal transmitted by the transmitter is received at each of the antennas. By comparing the carrier phases of the received signals, the phase difference can be determined. From this phase difference and the known distance, d, between the antennas, the Cartesian (x,y) location of the transmitter relative to the receiver can be directly determined.

8 Claims, 9 Drawing Sheets

(56) References Cited

U.S. PATENT DOCUMENTS

| | | |
|---|---|---|
| 10,056,993 B2 | 8/2018 | Clancy et al. |
| 10,509,116 B2 | 12/2019 | McLaughlin et al. |
| 2007/0085715 A1 | 4/2007 | McLaughlin |
| 2007/0140323 A1 | 6/2007 | Patel et al. |
| 2007/0159924 A1 | 7/2007 | Vook et al. |
| 2008/0112440 A1 | 5/2008 | Bedekar et al. |
| 2009/0243932 A1 | 10/2009 | Moshfeghi |
| 2009/0310444 A1 | 12/2009 | Hiroe |
| 2009/0316529 A1 | 12/2009 | Huuskonen et al. |
| 2010/0087151 A1 | 4/2010 | Auer |
| 2010/0097270 A1 | 4/2010 | Fukada |
| 2012/0276921 A1 | 11/2012 | Nemeth |
| 2013/0163638 A1 | 6/2013 | McLaughlin et al. |
| 2014/0093023 A1 | 4/2014 | Park |
| 2014/0204977 A1 | 7/2014 | Morche |
| 2016/0254889 A1 | 9/2016 | Shattil |
| 2016/0259033 A1 | 9/2016 | Madimirov et al. |
| 2017/0085293 A1 | 3/2017 | Marrow |
| 2019/0204432 A1 | 7/2019 | Safaripour et al. |
| 2019/0289568 A1 | 9/2019 | Pajovic et al. |
| 2019/0331781 A1 | 10/2019 | McLaughlin et al. |
| 2019/0331782 A1 | 10/2019 | McLaughlin et al. |
| 2020/0252101 A1 | 8/2020 | McLaughlin et al. |
| 2020/0334394 A1 | 10/2020 | Wodrich et al. |

OTHER PUBLICATIONS

Advisory Action for U.S. Appl. No. 16/352,372, dated May 19, 2021, 3 pages.

Notice of Allowance for U.S. Appl. No. 16/780,004, dated May 27, 2021, 17 pages.

Alexander, S.N., "Soviet Computer Technology—1959," Communications of the ACM, vol. 3, Issue 3, Mar. 1960, pp. 131-166.

Carr, J.W. et al., "A Visit to Computation Centers in the Soviet Union," Communications of the ACM, vol. 2, Issue 3, Jun. 1959, pp. 8-20.

Loeffler, A., "Localizing with Passive UHF RFID Tags Using Wideband Signals," IEEE International Conference on Microwaves, Communications, Antennas and Electronics Systems (COMCAS), Nov. 7-9, 2011, Tel Aviv, Israel, IEEE, 6 pages.

Manteuffel, D. et al., "Antenna and Propagation impairments of a UWB localization system integrated into an aircraft cabin," 2010 Loughborough Antennas & Propagation Conference, Nov. 8-9, 2010, Loughborough, Uk, IEEE, pp. 589-592.

Song, "A Low Complexity Asynchronous UWB TDOA Localization Method," International Journal of Distributed Sensor Networks, vol. 2015, Article IDS 675490, Oct. 2015, Hindawi Publishing Corporation, 11 pages.

Wang, Z. et al., "A New Multi-Antenna Based LOS-NLOS Separation Technique," 2009 IEEE 13th Digital Signal Processing Workshop and 5th IEEE Signal Processing Education Workshop, Jan. 4-7, 2009, Marco Island, L, IEEE, pp. 331-336.

Non-Final Office Action for U.S. Appl. No. 15/375,739, dated Jun. 9, 2017, 12 pages.

Final Office Action for U.S. Appl. No. 15/375,739, dated Nov. 9, 2017, 14 pages.

Applicant-Initiated Interview Summary for U.S. Appl. No. 15/375,739, dated Mar. 1, 2018, 3 pages.

Notice of Allowance for U.S. Appl. No. 15/375,739, dated Jul. 17, 2018, 10 pages.

Non-Final Office Action for U.S. Appl. No. 15/974,412, dated Apr. 25, 2019, 9 pages.

Notice of Allowance for U.S. Appl. No. 15/974,412, dated Oct. 23, 2019, 8 pages.

Non-Final Office Action for U.S. Appl. No. 16/352,105, dated Aug. 25, 2020, 11 pages.

Final Office Action for U.S. Appl. No. 16/352,105, dated Feb. 5, 2021, 13 pages.

Non-Final Office Action for U.S. Appl. No. 16/352,372, dated Oct. 9, 2020, 13 pages.

Final Office Action for U.S. Appl. No. 16/352,372, dated Feb. 5, 2021, 15 pages.

International Search Report and Written Opinion for International Patent Application No. PCT/EP2013/070851, dated Jun. 4, 2014, 13 pages.

International Preliminary Report on Patentability for International Patent Application No. PCT/EP2013/070851, dated Apr. 21, 2016, 10 pages.

International Search Report and Written Opinion for International Patent Application No. PCT/EP2014/060722, dated Jan. 28, 2015, 10 pages.

International Preliminary Report on Patentability for International Patent Application No. POT/EP2014/060722, dated Dec. 8, 2016, 8 pages.

Non-Final Office Action for U.S. Appl. No. 16/780,004, dated Aug. 26, 2020, 9 pages.

Notice of Allowance for U.S. Appl. No. 16/780,004, dated Dec. 28, 2020, 8 pages.

Advisory Action for U.S. Appl. No. 16/352,105, dated May 10, 2021, 3 pages.

Non-Final Office Action for U.S. Appl. No. 16/352,372, dated Sep. 3, 2021, 12 pages.

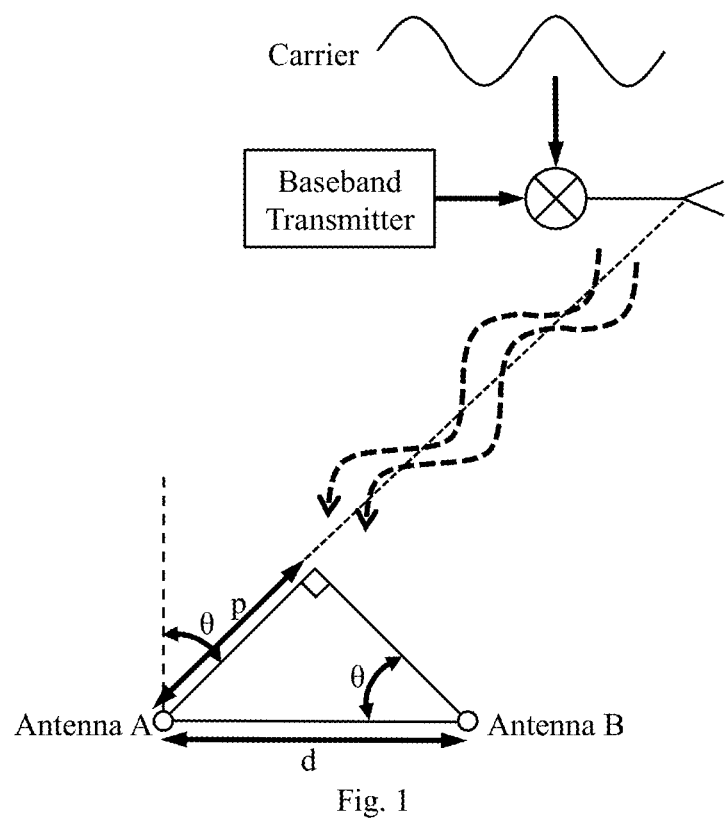
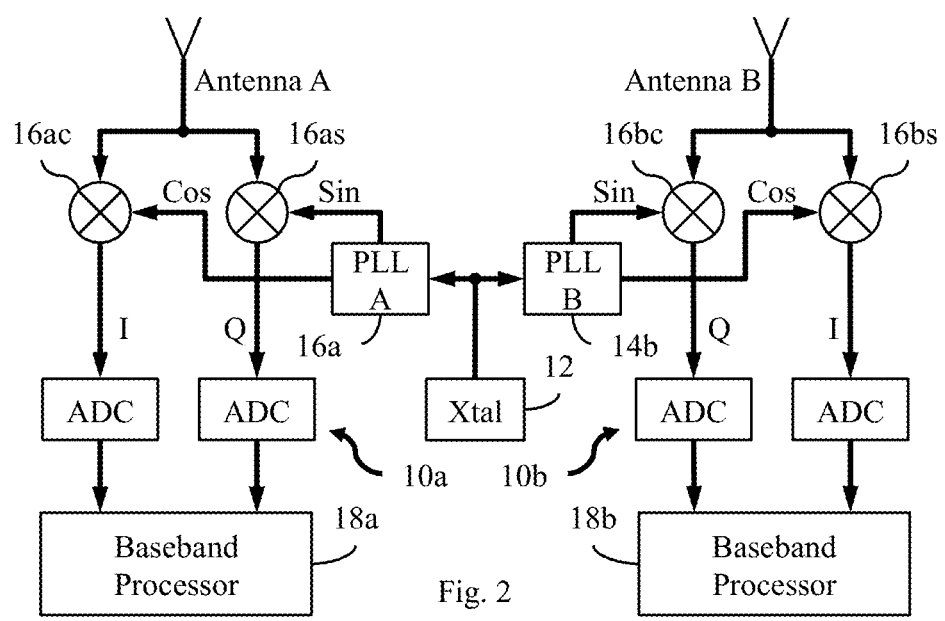
Fig. 1
Fig. 2

METHOD AND APPARATUS FOR DETERMINING LOCATION USING PHASE DIFFERENCE OF ARRIVAL

CROSS-REFERENCE TO RELATED APPLICATIONS

This application is a Divisional Application of application Ser. No. 15/974,412, filed 8 May 2018, now U.S. Pat. No. 10,509,116 ("First Parent Application"), which is in turn related, and claims priority to Provisional Application Ser. No. 62/663,122, filed 26 Apr. 2018 ("Parent Provisional").

The subject matter of this Application is also related to the subject matter of PCT Application Serial No. PCT/EP2014/060722, filed 23 May 2014 ("First Related Application").

The subject matter of this Application is related to U.S. application Ser. No. 15/375,739, filed 12 Dec. 2016, now U.S. Pat. No. 10,056,993 ("Second Related Application").

This application claims priority to:
1. the First Parent Application; and
2. the Parent Provisional;
collectively, "Related References", and hereby claims benefit of the filing dates thereof pursuant to 37 CFT § 1.78(a)(4).

The subject matter of the Related References, and the First and Second Related Applications, each in its entirety, is expressly incorporated herein by reference.

BACKGROUND OF THE INVENTION

1. Field of the Invention

The present invention relates generally to ultra-wideband communication systems, and, in particular, to a receiver for use in an ultra-wideband communication system adapted to determine the location of an RF transmitter relative to an RF receiver.

2. Description of the Related Art

In general, in the descriptions that follow, we will italicize the first occurrence of each special term of art which should be familiar to those skilled in the art of ultra-wideband ("UWB") communication systems. In addition, when we first introduce a term that we believe to be new or that we will use in a context that we believe to be new, we will bold the term and provide the definition that we intend to apply to that term. In addition, throughout this description, we will sometimes use the terms assert and negate when referring to the rendering of a signal, signal flag, status bit, or similar apparatus into its logically true or logically false state, respectively, and the term toggle to indicate the logical inversion of a signal from one logical state to the other. Alternatively, we may refer to the mutually exclusive boolean states as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

In the RF system topology shown in FIG. 1, it can be seen that, because of the non-zero angle of incidence, θ, the RF signal will arrive at one antenna before the other. In particular, it can be seen that the path to antenna A is greater than to antenna B by p=d*sin θ. In order to calculate θ, the angle of incidence, the time difference of arrival could be found. If d is relatively large then this would provide quite an accurate estimate of θ. On the other hand, if d is small the estimate turns out to be highly error prone.

FIG. 2 shows two receivers, 10*a* and 10*b*, which are clocked from the same crystal 12. If the same crystal 12 clocks identical phase locked loops ("PLLs"), 14*a* and 14*b*, the generated carriers that are supplied to the respective down converter mixers, 16*ac*-16*as* and 16*bc*-16*as*, will have the same phase. The RF signal will arrive at a slightly later time at antenna A than antenna B, so it will encounter a down converter carrier phase that is different in each of the mixers 16. If the baseband processors, 18*a* and 18*b*, are capable of calculating the complex impulse response of the channel, that impulse response will have a different in-phase ("I") to quadrature ("Q") ratio I/Q which is equal to the phase delay caused by the signal travelling the extra distance, p, before encountering the mixer 10*a* and being down-converted by the carrier. If the carrier frequency is high, e.g., 4 GHz or 6.5 GHz, then quite small distances, p, will lead to a relatively large carrier phase difference.

$$\sin \theta = P/d \qquad [\text{Eq. 1}]$$

$$\lambda = c/f \qquad [\text{Eq. 2}]$$

where:
f is the carrier frequency,
c is the speed of light, and
λ is the carrier wavelength.

$$\alpha/2\pi = P/\lambda \qquad [\text{Eq. 3}]$$

where:
α is the phase difference between the two carriers for the same point on the incident RF signal.

$$p = a\lambda/2\pi \text{ (from Eq. 2 and Eq. 3)} \qquad [\text{Eq. 4}]$$

$$\sin \theta = a\lambda/2\pi d \text{ (from Eq. 1 and Eq. 4)} \qquad [\text{Eq. 5}]$$

$$\theta = \sin^{-1}(a\lambda/2\pi d) \text{ (from Eq. 5)} \qquad [\text{Eq. 6}]$$

Many angle-of-arrival ("AoA") estimators require the use of multiple receivers, each listening to its own antenna, see, e.g., the First Related Application. In some AoA estimators, a single receiver is electronically switched between a plurality of antennas, see, e.g., the Second Related Application. In all such embodiments, the AoA approach tends to be problematic. In the Second Related Reference, several possible solutions are proposed.

Using two or more receiver antennas, the location of a transmitter can be found by using time of flight to get the distance to the transmitter and using the difference in either; time of arrival, or phase of arrival, to calculate an angle of arrival. However, we submit that it is unnecessary to calculate the angle of arrival in order to find that location. Further, we submit that what is needed is an improved method and apparatus for use in the receiver of a UWB communication system to determine the (x,y) location of a transmitter with respect to a receiver. In particular, we submit that such a method and apparatus should provide performance generally comparable to the best prior art techniques but more efficiently than known implementations of such prior art techniques.

BRIEF SUMMARY OF THE INVENTION

In accordance with a one embodiment of our invention, we provide a method for determining the (x,y) location of a UWB transmitter relative to a UWB receiver. In accordance with this method, we use: the first antenna to receive a transmitted signal; the second antenna to receive the transmitted signal; and the receiver to: develop a range, r, between the transmitter and the first antenna; develop a first phase value as a function of the complex baseband impulse response of the transmitted signal received by the first antenna; develop a second phase value as a function of the complex baseband impulse response of the transmitted signal received by the second antenna; develop a phase difference value, p, as a function of the first and second phase values; and develop the (x,y) location of the transmitter relative to the receiver as a function of d, r and p.

In accordance with another embodiment of our invention, we provide a method for determining the (x,y) location of a UWB transmitter relative to a UWB receiver. In accordance with this method, we use: the first antenna to receive a transmitted signal; the second antenna to receive the transmitted signal; and the receiver to: develop a range, r, between the transmitter and the first antenna; develop a first time of arrival value as a function of the complex baseband impulse response of the transmitted signal received by the first antenna; develop a second time of arrival value as a function of the complex baseband impulse response of the transmitted signal received by the second antenna; develop a path difference value, p, as a function of the first and second time of arrival values; and develop the (x,y) location of the transmitter relative to the receiver as a function of d, r and p.

In accordance with yet another embodiment of our invention, we provide a method for determining the (x,y) location of a UWB transmitter relative to a UWB receiver. In accordance with this method, we use: the first antenna to receive a transmitted signal; the second antenna to receive the transmitted signal; and the receiver to: develop a range, r, between the transmitter and the first antenna; develop a first time of flight value as a function of the complex baseband impulse response of the transmitted signal received by the first antenna; develop a second time of flight value as a function of the complex baseband impulse response of the transmitted signal received by the second antenna; develop a path difference value, p, as a function of the first and second time of flight values; and develop the (x,y) location of the transmitter relative to the receiver as a function of d, r and p.

In accordance with one other embodiment of our invention, we provide a method for determining the (x,y) location of a UWB transmitter relative to a UWB receiver. In accordance with this method, we first use: the first antenna to receive a first transmitted signal; the second antenna to receive the first transmitted signal; and the receiver to: develop a first range, $r_1$, between the transmitter and either the first or second antenna; develop a first phase value as a function of the complex baseband impulse response of the first transmitted signal received by the first antenna; develop a second phase value as a function of the complex baseband impulse response of the second transmitted signal received by the second antenna; develop a first phase difference value, $p_1$, as a function of the first and second phase values. Then, we use: the first antenna to receive a second transmitted signal; the second antenna to receive the second transmitted signal; and the receiver to: develop a second range, $r_2$, between the transmitter and either the first or second antenna; develop a third phase value as a function of the complex baseband impulse response of the second transmitted signal received by the first antenna; develop a fourth phase value as a function of the complex baseband impulse response of the second transmitted signal received by the second antenna; develop a second phase difference value, $p_2$, as a function of the third and fourth phase values; and develop the (x,y) location of the transmitter relative to the receiver as a function of d, $r_1$, $p_1$, $r_2$ and $p_2$.

In one embodiment, we provide a location determination circuit configured to perform our method for determining relative location.

In one other embodiment, we provide an RF receiver comprising a location determination circuit circuit configured to perform our method for determining relative location.

In yet another embodiment, we provide an RF transceiver comprising an RF receiver comprising a location determination circuit circuit configured to perform our method for determining relative location.

In still another embodiment, we provide an RF communication system comprising an RF transceiver comprising an RF receiver comprising a location determination circuit circuit configured to perform our method for determining relative location.

The methods of our invention may be embodied in non-transitory computer readable code on a suitable computer readable medium such that when a processor executes the computer readable code, the processor executes the respective method.

BRIEF DESCRIPTION OF THE SEVERAL VIEWS OF THE DRAWINGS

Our invention may be more fully understood by a description of certain preferred embodiments in conjunction with the attached drawings in which:

FIG. 1 illustrates, generally in topographic perspective, an RF communication system, and, in particular, illustrates the different angles of incidence of the transmitted RF signal on two antennas spaced apart by a distance d;

FIG. 2 illustrates, in block diagram form, the antennas of FIG. 1, together with the respective RF receivers;

FIG. 11, comprising

Figure 3:
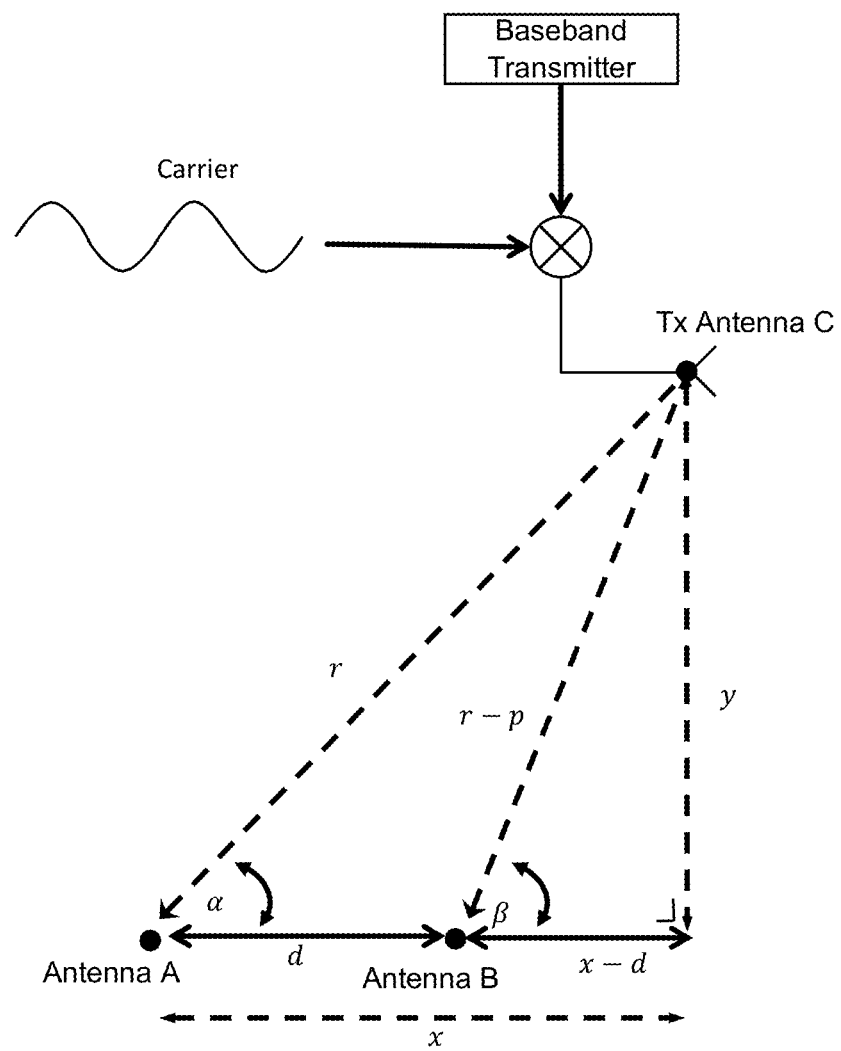
FIG. 3 illustrates, in block diagram form, one application of our invention to determine the location of a transmitter relative to a multi-antenna receiver.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

We have discovered that it is possible to get the Cartesian (x,y) location of a transmitter relative to a multi-antenna receiver directly from the range and the path difference without going through an intermediary step of calculating an angle of arrival. In accordance with our invention, the path difference can be determined either by using: the difference in the phase of a received frame at two of the antennas; the difference in time of arrivals of a received frame at two of the antennas; or the difference in ranges measured to two of the antennas. Further, our method can be implemented in an RF system comprising: multiple receivers, each with a respective antenna; a single receiver having multiple antennas; or any combination thereof.

In the example illustrated in FIG. 3, the geometric distance between antenna A and antenna B is known to be d; and the path difference between antenna A and antenna B is determined to be p. Using well known methods, we can determine the range, r, between antenna A and antenna C, e.g., by measuring the time of flight between A and C. Provided that d is less than or equal to one half the wavelength, $\lambda$, of the signal transmitted from antenna C, p will always be between $-\lambda/2$ and $+\lambda/2$. We can now determine the (x,y) location of the transmitter relative to the receiver as follows:

using the cosine rule:

$$\cos(A) = (b^2 + c^2 - a^2)/2bc \quad [\text{Eq. 7}]$$

$$\cos(\alpha) = (r^2 + d^2 - (r-p)^2)/2rd \quad [\text{Eq. 8}]$$

$$x/r = (r^2 + d^2 - r^2 + 2rp - p^2)/2rd \quad [\text{Eq. 9}]$$

$$x = (d^2 + 2rp - p^2)/2d \quad [\text{Eq. 10}]$$

$$r^2 = x^2 + y^2 \quad [\text{Eq. 11}]$$

$$y = \pm\sqrt{r^2 - x^2} \quad [\text{Eq. 12}]$$

or, alternatively:

$$(x^2 + y^2) = ((d^2 + 2rp - p^2)/2d)^2 + y^2 = r^2 \quad [\text{Eq. 13}]$$

$$y^2 = r^2((d^2 + 2rp - p^2)/2d)^2 \quad [\text{Eq. 14}]$$

$$y = \pm(\sqrt{(d^2-p^2)((2r-p)^2-d^2)}/2d) \quad [\text{Eq. 15}]$$

$$y = \pm(\sqrt{(d^2-p^2)(4r^2-4rp+p^2-d^2)}/2d) \quad [\text{Eq. 16}]$$

$$y = \pm(\sqrt{(1-(p/d)^2)(4r^2-4rp+p^2-d^2)}/2) \quad [\text{Eq. 17}]$$

Note that we cannot tell if the y coordinate is positive or negative, so there is a front/back ambiguity.

We note that d is small compared to r so $d^2$ is very small compared to $r^2$ and can be neglected:

$$y \approx \pm(\sqrt{(1-(p/d)^2)(4r^2-4rp+p^2)}/2) \quad [\text{Eq. 18}]$$

$$y \approx \pm(r-(p/2))\sqrt{1-(p/d)^2} \quad [\text{Eq. 19}]$$

We have determined that the maximum error by using this approximation is 0.22 mm for a 6.5 GHz carrier and a receiver antenna separation of $\lambda/2$. So, using Eq. 10 and Eq. 12, or Eq. 10 and Eq. 19, we can calculate the (x,y) coordinates of the transmitter without calculating the angle of arrival. We just need to know:

r—the range to one of the antennas;
d—the distance between the two antennas; and
p—the path difference for the signal arriving at the two antennas.

One of the most accurate ways to get the path difference is to get the phase difference of arrival of the transmitted signal in fractions of a cycle, and then multiply by the wavelength. Another way is to get the time difference of arrival of the transmitted signal, and multiply by the speed of light. A third way is to get the difference in time of flight, and multiply by the speed of light.

Figure 4:
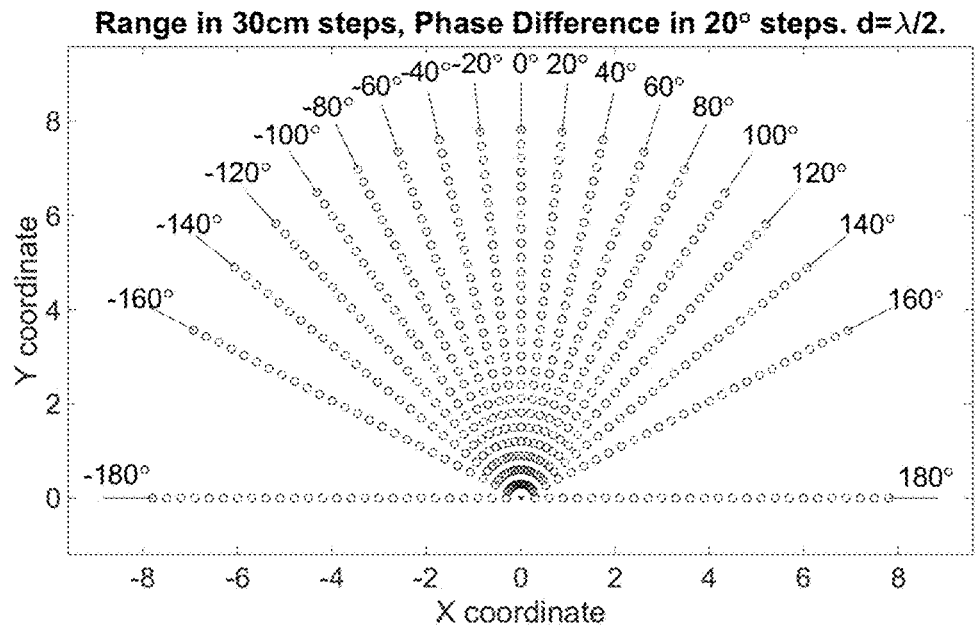
FIG. 4 illustrates, in chart form, the relationship between range and phase difference for an antenna separation of $\lambda/2$ using a single carrier.

As can be seen in FIG. 4, however, that the location uncertainty at phase differences near +/-180° is quite large. Thus, a very small change in phase gives a large change in y position. We can see this sensitivity in Eq. 19, resulting from the $(1-(p/d)^2)$ term under the radical. Accordingly, small errors due to noise at these larger phase differences are amplified compared to when the phase difference is in the +/-90° region. Also, extra care must be taken when calculating the square root in this region.

Consider, for example, the Taylor series for $\sqrt{1-x^2}$:

$$1 - \frac{x^2}{2} - \frac{x^4}{8} - \frac{x^6}{16} - \frac{5x^8}{128} - \frac{7x^{10}}{256} - \quad \text{(Taylor series)}$$
$$\frac{21x^{12}}{1024} - \frac{33x^{14}}{2048} - \frac{429x^{16}}{32768} + O(x^{18})$$

Using 6 terms in this Taylor expansion, the calculation is accurate to 2 cm up to a phase difference of 140° and to 5 cm up to 150°. Above 150°, however, the error increases rapidly. So, we will use a two-polynomial piece-wise approximation for the square root function:

```
function y=polysqrt(x);
    p1=[107.81 -33.530 4.91940 0.05019]; % polynomial 1 coefficients
    p2=[0.3557 -0.9585 1.40389 0.20150]; % polynomial 2 coefficients
    y1=sum(p1.*x.^[3 2 1 0]); % evaluate y1 for small x
    y=sum(p2.*x.^[3 2 1 0]); % evaluate y for larger x
    y(x<0.144)=y1(x<0.144); % use y1 fox x<0.144
    y(x<.002)=0; % set very small values to zero
end
```

Using this approximation gives a worst case error in position of 2.5 cm within a 10 m radius, and an RMS error of 0.77 cm.

Figure 5:
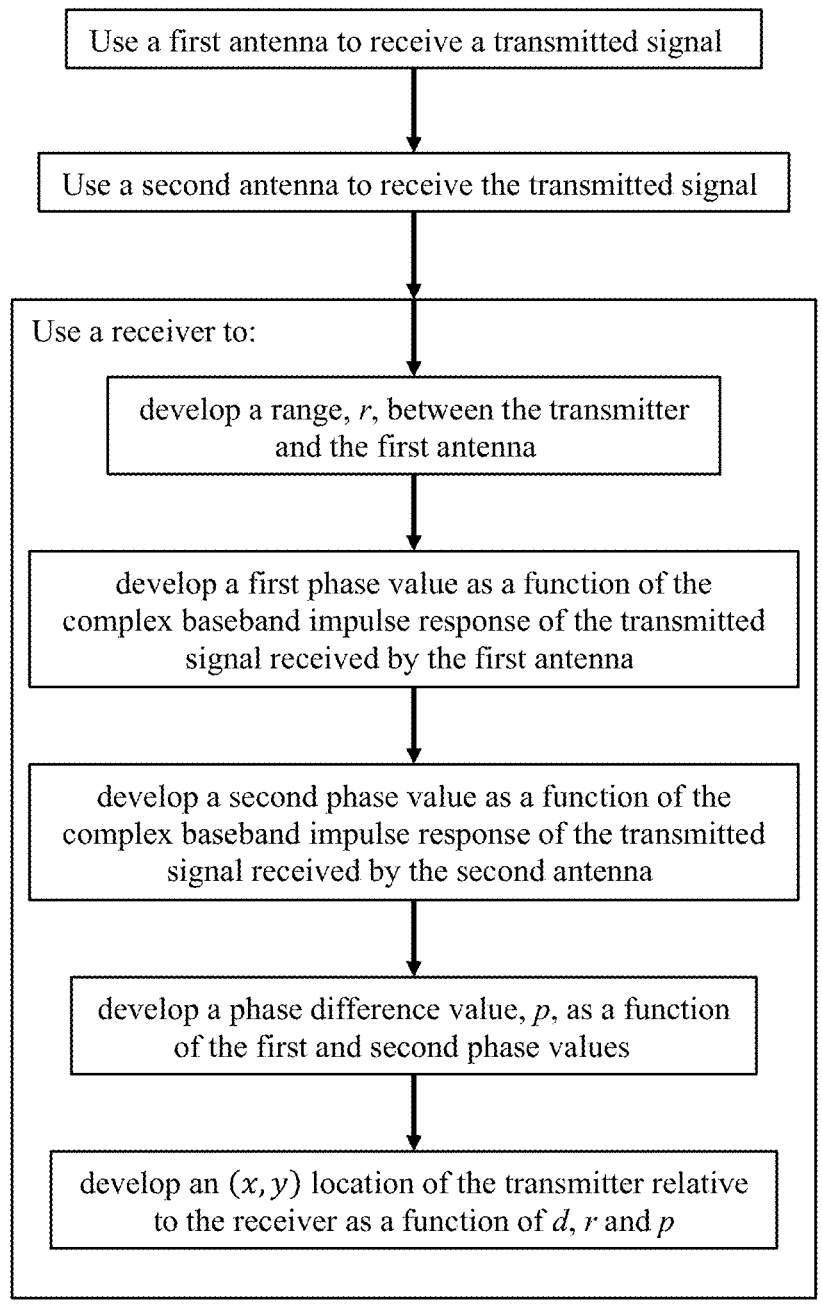
FIG. 5 illustrates, in flow diagram form, a phase difference embodiment of a method adapted for use in the embodiment set forth in FIG. 3.
Figure 6:
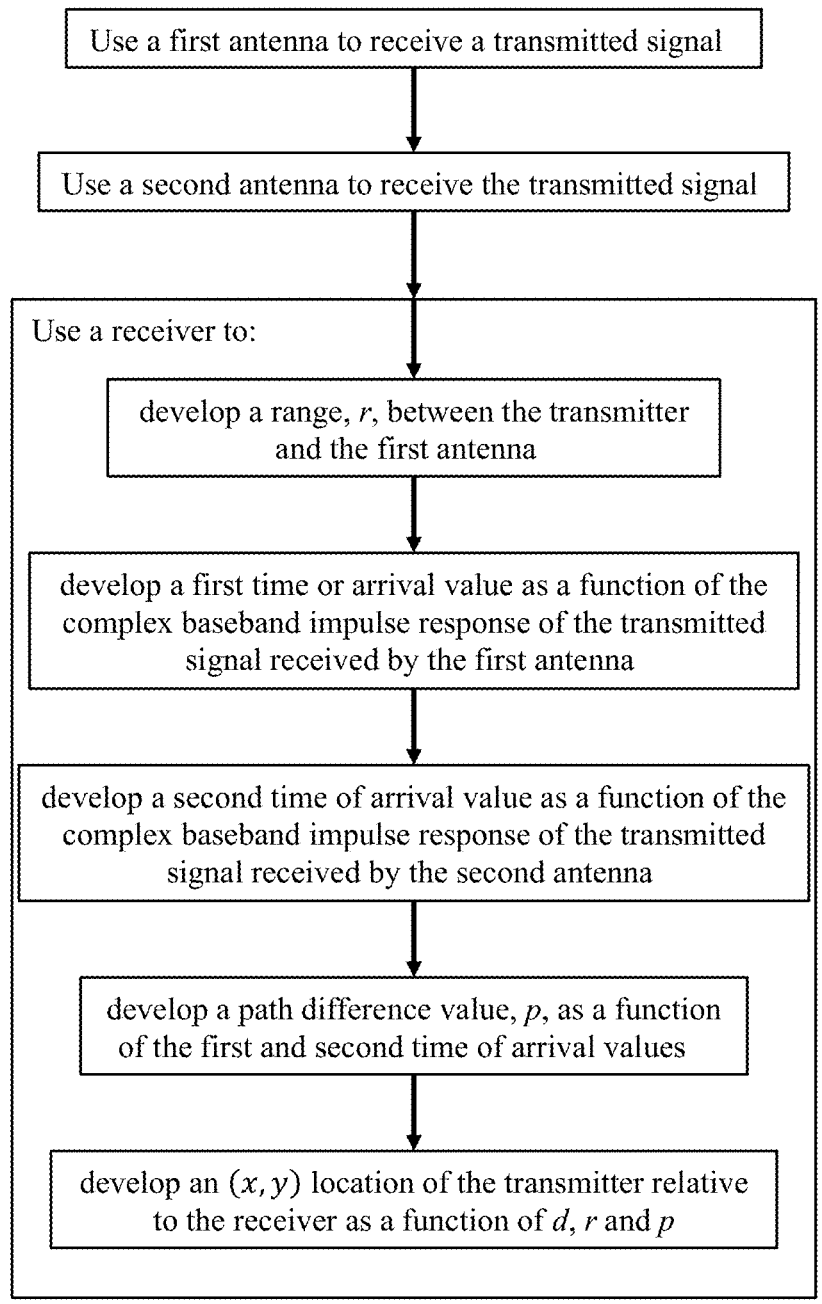
FIG. 6 illustrates, in flow diagram form, a time of arrival difference embodiment of a method adapted for use in the embodiment set forth in FIG. 3.
Figure 7:
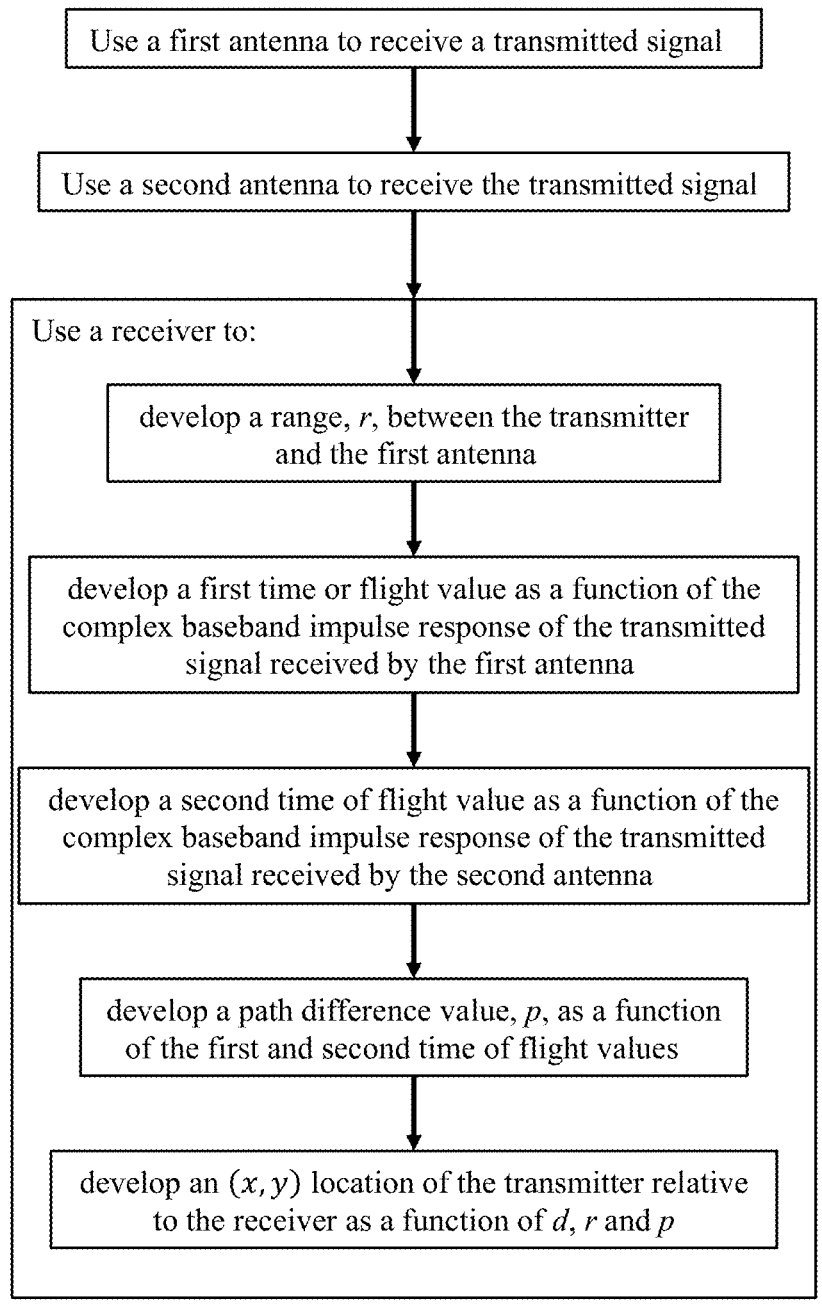
FIG. 7 illustrates, in flow diagram form, time of flight difference embodiment of a method adapted for use in the embodiment set forth in FIG. 3.

By way of example, in FIG. 5, we have illustrated a phase difference embodiment of our method adapted for use in the embodiment illustrated in FIG. 3. Further, also by way of example, we have illustrated in FIG. 6 a time of arrival difference embodiment of our method adapted for use in the embodiment illustrated in FIG. 3. In FIG. 7, we have illustrated one example of a time of flight difference embodiment of our method adapted for use in the embodiment illustrated in FIG. 3.

Figure 8:
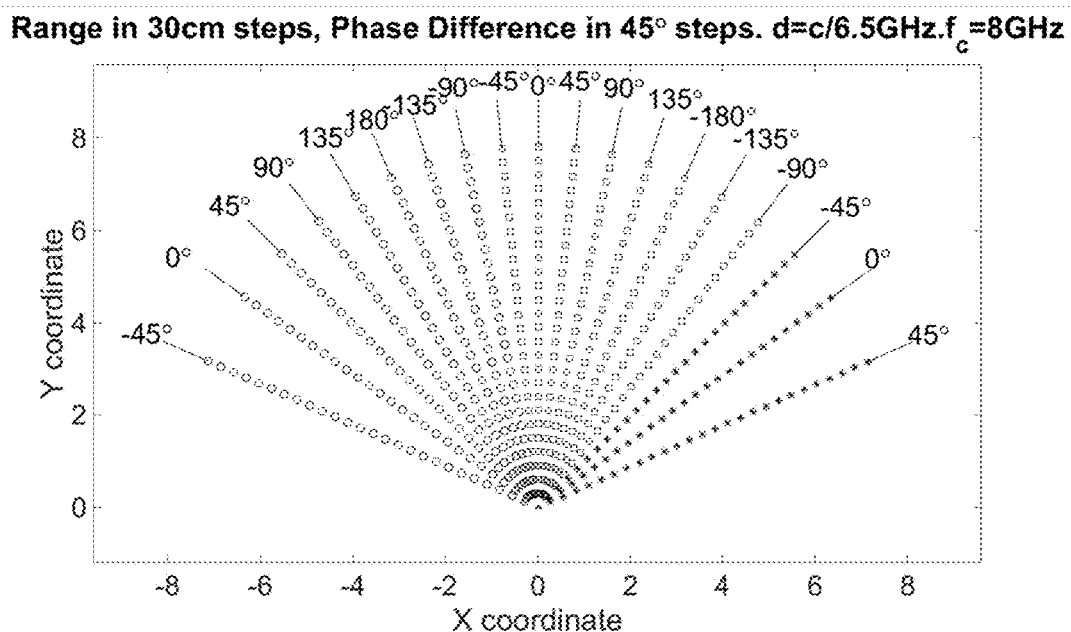
FIG. 8 illustrates, in chart form, the relationship between range and phase difference for an antenna separation greater than $\lambda/2$ using a single carrier.
Figure 9:
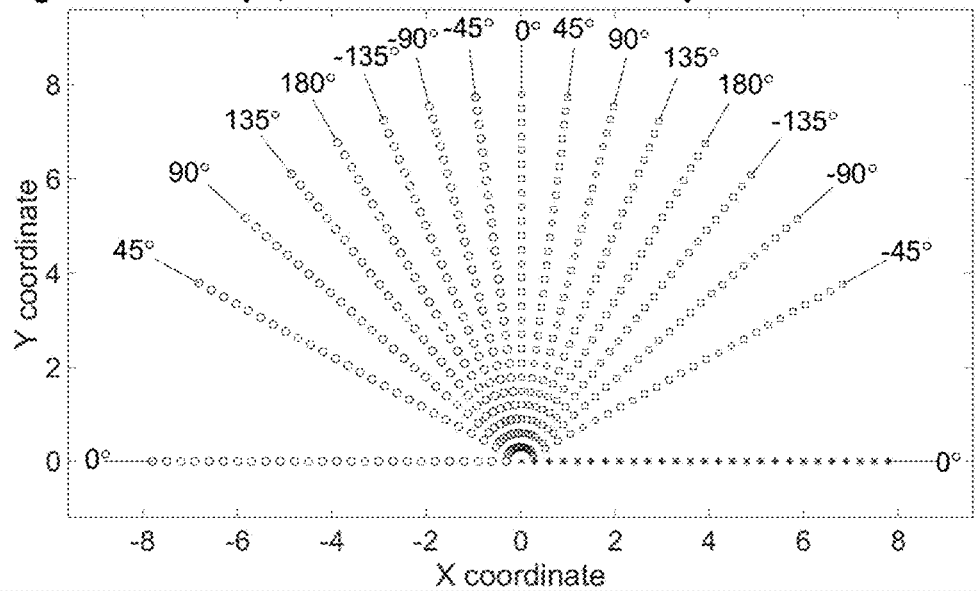
FIG. 9 illustrates, in chart form, the relationship between range and phase difference for the same antenna separation as in FIG. 8, i.e., greater than $\lambda/2$, but using a different carrier than in FIG. 8.
Figure 11A:
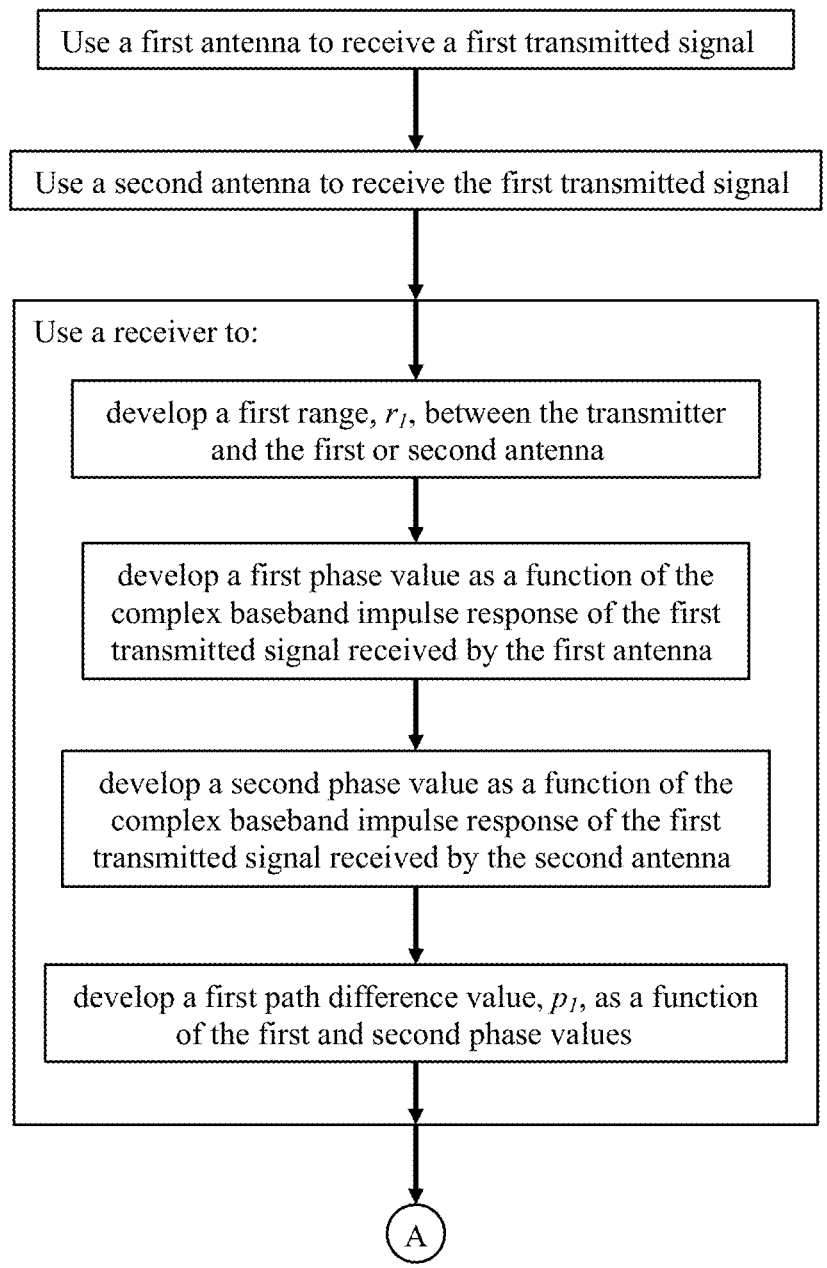
FIG. 11A and FIG. 11B, illustrates, in flow diagram form, a multi-carrier, multi-transmission embodiment of a method adapted for use in the embodiment set forth in FIG. 3.
Figure 11B:
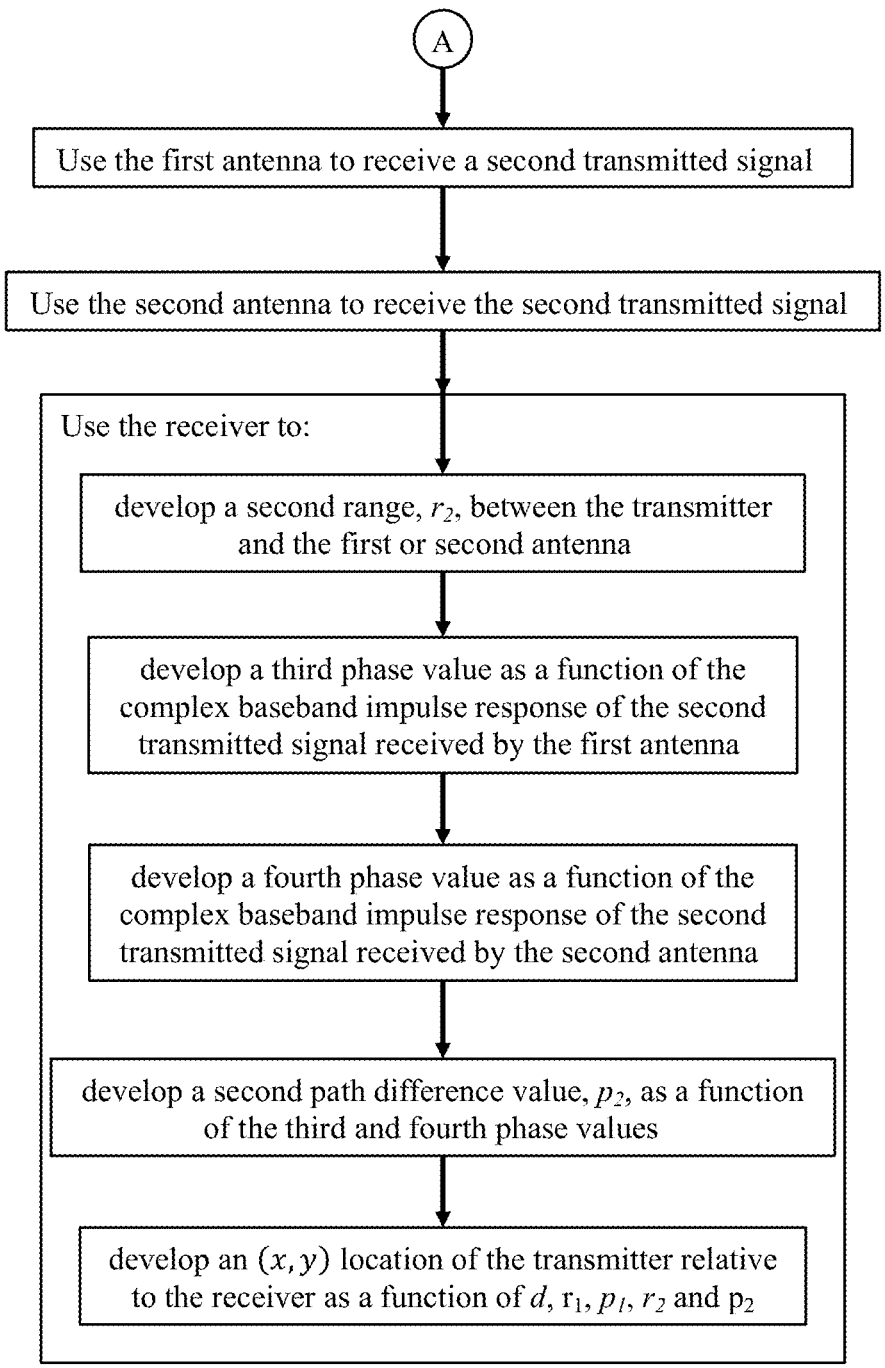

When the distance between the antennas is greater than half the wavelength of the center frequency, a particular phase difference can give more than one valid solution, because adding 360° will give the same phase difference. For instance, if the center frequency is 8 GHz and the distance between the antennas is 1 wavelength of a 6.5 GHz carrier, we would have the situation shown in FIG. 8. As we can see, for many values of phase difference, there are three possible solutions. But switching to a channel with a 6.5 GHz carrier would give the situation shown in FIG. 9. In this case, apart from the 0° case, there are always two possible solutions for each phase difference. Fortunately, we can use this fact to our advantage. If the distance between the antennas is greater than one half wavelength, we can set the carrier frequency to one channel, and then measure the range and phase difference as before. This will give us more than one (x,y) coordinate—let us call this set of possible solutions Set 1. We then switch the carrier frequency to a different channel, and repeat the measurement on the new channel. This will also give us multiple solutions—let us call this set of possible solutions Set 2. We can then discard all solutions which don't appear in both Set 1 and Set 2. This will generally leave only one (,y) coordinate. By way of example, in FIG. 11, we have illustrated one example of a multi-carrier, multi-transmission embodiment of our method adapted for use in the embodiment illustrated in FIG. 3.

In practice, noise perturbations in the phase measurement will almost always ensure that the corresponding solutions will not be exactly the same, so we must pick pairs of solutions, one from each set, which are closest to each other in the Euclidean sense. A well known way to do this is to pick the $(x_i, y_i)$ from Set 1 and the $(x_j, x_j)$ from Set 2 that minimizes:

$$\sqrt{(x_i+x_j)^2+(y_i-y_j)^2} \qquad [\text{Eq. 20}]$$

To get even better results, we can repeat this on a third (or even fourth or fifth) channel. For a third channel, we could pick the $(x_i, y_i)$ from Set 1, $(x_j, y_j)$ from Set 2 and the $(x_k, y_k)$ from a Set 3 that minimizes:

$$\sqrt{\begin{array}{c}(x_i - x_j)^2 + (x_i - x_k)^2 + (x_j - x_k)^2 + \\ (y_i - y_j)^2 + (y_i - y_k)^2 + (y_j - y_k)^2\end{array}} \qquad [\text{Eq. 21}]$$

Up to this point, we have assumed that the effective, i.e., measured, path difference is precisely equal to the Cartesian path difference. However, in a real system, the effective path difference and the Cartesian path difference will not be precisely equal. For example, when our two antennas are closer than a few wavelengths, the antennas interact through an effect known as mutual coupling; this causes the electromagnetic waves to behave differently than would be the case in free space resulting in different effective and Cartesian path differences as a function of the path difference. Another effect seen in the real world is that the feed wires to the antennas can have slightly difference lengths, or the paths from the down-mixer generator to the two separate down-mixers can have slightly different lengths. These two effects, and others, add a calculatable offset to the path difference.

Figure 10:
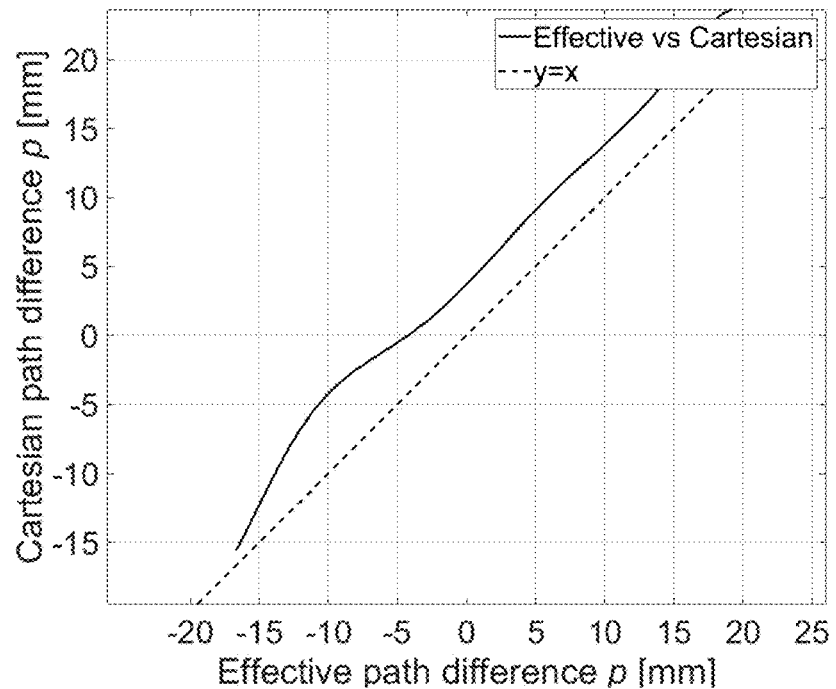
FIG. 10 illustrates, in chart form, one example of a correction function for compensating for path distortion resulting from real world effects.

We propose to compensate for these cumulative effects by developing a Calibration Function between the effective and Cartesian path differences. In accordance with this embodiment, we first perform a system calibration process wherein a number of calibration measurements are taken, each from a different known (x,y) coordinate but, collectively, having a wide range of actual path differences. Since we know all of the (x,y) coordinates, we can calculate the respective expected path differences. By measuring the respective phase differences, we can also calculate the respective effective path differences. In this way we can develop a suitable Calibration Function, e.g., in the form of a look-up table or as apiece-wise linear generator function or by using a polynomial fitting function. Then we can use this Calibration Function to correct the effective path difference, p, before applying the formulas to calculate the (x,y) coordinates. By way of example, in FIG. 10, we have illustrated one possible Calibration Function.

Although we have described our invention in the context of particular embodiments, one of ordinary skill in this art will readily realize that many modifications may be made in such embodiments to adapt either to specific implementations. For example, rather than calculating the path difference, p, one might directly determine the range, $r_2$, between the second antenna and the receiver using the same method used to determine the range, $r_1$, between the first antenna and the receiver. Further, the several elements described above may be adapted so as to be operable under either hardware or software control or some combination thereof, as is known in this art. Alternatively, the several methods of our invention as disclosed herein in the context of special purpose receiver apparatus may be embodied in computer readable code on a suitable non-transitory computer readable medium such that when a general or special purpose computer processor executes the computer readable code, the processor executes the respective method.

Thus it is apparent that we have provided a method and apparatus for determining the location of a wireless transmission relative to a multi-antenna receiver. Although we have so far disclosed our invention only in the context of a packet-based UWB communication system, we appreciate that our invention is broadly applicable to other types of wireless communication systems, whether packed-based or otherwise, that perform channel sounding. Further, we submit that our invention provides performance generally comparable to the best prior art techniques but more efficiently than known implementations of such prior art techniques.

What we claim is:

1. In an ultra-wideband (UW) system comprising a UWB transmitter adapted to transmit a first signal in a first channel and a second signal in a second channel different from the first channel, and a UWB receiver having first and second antennas separated by a first distance, d, a method comprising the steps of:

1.1 using the first antenna to receive the first transmitted signal;

1.2 using the second antenna to receive the first transmitted signal;

1.3 using the receiver to:

1.3.1 develop a first range, $r_1$, between the transmitter and a selected one of the first and second antennas;

1.3.2 develop a first phase value as a function of a complex baseband impulse response of the first transmitted signal received by the first antenna;

1.3.3 develop a second phase value as a function of a complex baseband impulse response of the first transmitted signal received by the second antenna;

1.3.4 develop a first path difference value, $p_1$, as a function of the first and second phase values;

1.4 using the first antenna to receive the second transmitted signal;

1.5 using the second antenna to receive the second transmitted signal;

1.6 using the receiver to:

1.6.1 develop a second range, $r_2$, between the transmitter and a selected one the first and second antennas;

1.6.2 develop a third phase value as a function of a complex baseband impulse response of the second transmitted signal received by the first antenna;

1.6.3 develop a fourth phase value as a function of a complex baseband impulse response of the second transmitted signal received by the second antenna;

1.6.4 develop a second path difference value, $p_2$, as a function of the third and fourth phase values; and 1.6.5 develop an (x,y) location of the transmitter relative to the receiver as a function of d, $r_1$, $p_1$, $r_2$, and $p_2$.

2. The method of claim 1, wherein d is greater than one half a wavelength, $\lambda_1$, of the first signal, and greater than one half a wavelength, $\lambda_2$, of the second signal.

3. The method of claim 1, wherein step 1.3.4 is further characterized as:

1.3.4 develop the first path difference value, $P_1$, as a function of the first and second phase values and of a selected first calibration function; and wherein step 1.6.4 is further characterized as:

1.6.4 develop the second path difference value, $p_2$, as a function of the third and fourth phase values and of a selected second calibration function.

4. A location determination circuit configured to perform the method of claim 1.

5. An RF receiver comprising the location determination circuit according to claim 4.

6. An RF transceiver comprising the wireless receiver according to claim 5.

7. An RF communication system comprising the wireless transceiver according to claim 6.

8. A non-transitory computer readable medium including executable instructions which, when executed in an RF system, causes the RF system to perform the steps of the method according to claim 1.

* * * * *

UNITED STATES PATENT AND TRADEMARK OFFICE
CERTIFICATE OF CORRECTION

| | | |
|---|---|---|
| PATENT NO. | : 11,215,704 B2 | Page 1 of 1 |
| APPLICATION NO. | : 16/352480 | |
| DATED | : January 4, 2022 | |
| INVENTOR(S) | : Michael McLaughlin et al. | |

It is certified that error appears in the above-identified patent and that said Letters Patent is hereby corrected as shown below:

In the Claims

Claim 1, Column 8, Line 39, replace "In an ultra-wideband (UW) system" with --In an ultra-wideband (UWB) system--.

Signed and Sealed this
Nineteenth Day of April, 2022

Katherine Kelly Vidal
*Director of the United States Patent and Trademark Office*